Oct. 23, 1923.
B. E. LEAS
RAKE
Filed Dec. 30, 1922
1,471,964
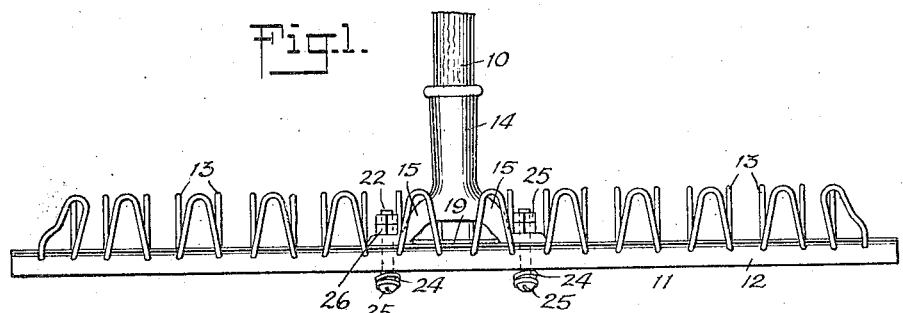
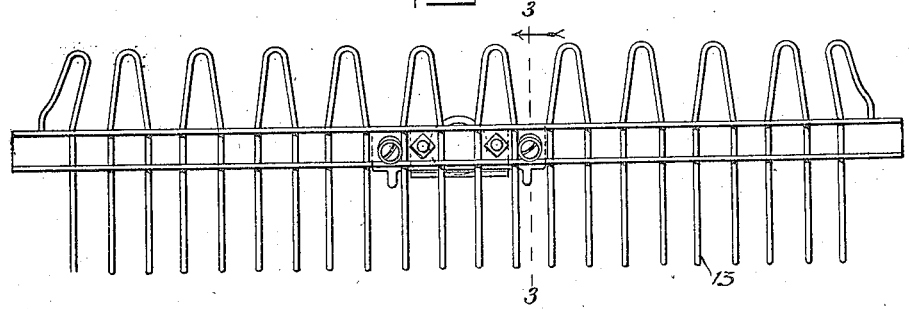
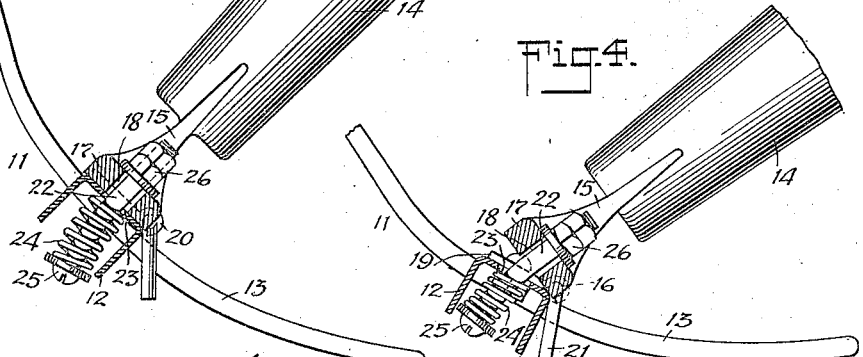
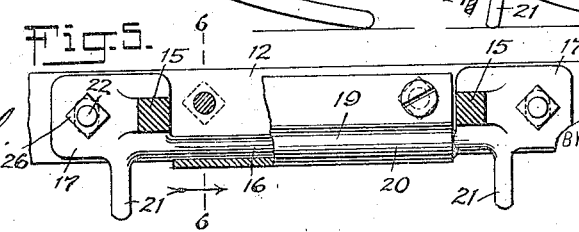
WITNESSES
INVENTOR
BERT E. LEAS
ATTORNEYS Patented Oct. 23, 1923.

1,471,964

UNITED STATES PATENT OFFICE.

BERT E. LEAS, OF LUVERNE, MINNESOTA.

RAKE.

Application filed December 30, 1922. Serial No. 609,975.

*To all whom it may concern:*

Be it known that I, BERT ELWOOD LEAS, a citizen of the United States, and a resident of Luverne, in the county of Rock and State of Minnesota, have invented a new and Improved Rake, of which the following is a full, clear, and exact description.

This invention has relation to rakes and contemplates new and useful improvements in self-cleaning rakes of the character set forth in my prior applications Serial Nos. 512,006 and 547,773.

The present invention aims for its principal object to simplify the construction and reduce the cost of production of a rake of the character described.

As a further object the invention contemplates in combination with a rake having a handle and a rake head with a connection therebetween to permit of relative angular movement, adjustable means for limiting the angular movement of the rake head and handle.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawing—

Figure 1 is a top plan view of a rake constructed in accordance with the invention.

Fig. 2 is an end view thereof.

Fig. 3 is a sectional view taken approximately on the line 3—3 of Fig. 2 and illustrating the rake head in its normal position.

Fig. 4 is a similar sectional view illustrating the relative angular position of the rake head and handle for the purpose of clearing the tines upon the exertion of a downward pressure and forward movement of the rake.

Fig. 5 is a sectional view taken approximately on the line 5—5 of Fig. 3.

Fig. 6 is a detail sectional view taken approximately on the line 6—6 of Fig. 5.

Referring to the drawing by characters of reference, 10 designates the handle of the rake and 11 the head which consists of a transversely disposed tine supporting bar 12 and the tines 13.

A connection between the rake head and handle to permit of relative angular movement between the same for the purpose of clearing the tines by the exertion of a downward pressure and forward movement of the rake constitutes the gist of the present invention and in order to accomplish this, the improved connection consists of a sleeve 14 attached to one extremity of the handle 10, which sleeve is formed at its outer end with a pair of forks or arms 15 connected by a cross rod 16. The arms 15 are further provided with outwardly projecting lugs 17 which are apertured as at 18. The tine supporting bar 12 has bolted or otherwise secured thereto a plate 19 which is positioned between the arms and is formed with a semi-circular embracing portion 20 which encompasses the connecting rod 16 to provide a hinged connection between the rake head and the handle. This hinged connection is disposed adjacent the lower inner edge of the tine supporting bar whereby the swinging of the head is limited in one direction by the engagement of the tine supporting bar with the lugs 17. In order to limit relative angular movement of the tine supporting bar and tines in the opposite direction, the forks or arms 15 are further provided with angularly disposed projections 21. In order to maintain the tine supporting bar 12 and the tines or teeth 13 in their normal position whereby the tine supporting bar contacts with the lugs 17, bolts 22 extend through the apertures 18 of the lugs and aligned apertures 23 in the tine supporting bar, the said bolts having springs 24 interposed between their heads 25 and the tine supporting bar and being provided at their opposite extremities with retaining nuts 26. The bolts are preferably curved in order to compensate for the swinging movement of the head and handle with respect to each other.

In use and operation, the springs maintain the rake head in a normal position with the tine supporting bar in flat contact with the lugs 17 whereby the user in drawing the rake toward him may use the same in the ordinary capacity. When the teeth or tines 13 become clogged with leaves or other matter, it is only necessary for him to exert a downward pressure and forward movement of the rake over the ground or surface to clear the same as illustrated in Fig. 4. When the pressure is relieved, the springs 24 will function to return the rake head to its normal position. By this arrangement the necessity of having to remove the obstructions from the teeth by hand is eliminated, thus obviating the objection to this operation and the loss of time incident thereto.

I claim:

1. A rake including a handle and a head and a connection therebetween to permit of relative angular movements therebetween upon exertion of a downward pressure and forward movement of the rake head over the ground, comprising a forked sleeve carried by one extremity of the handle, a cross rod connecting the forked portion of the sleeve, a plate secured to the rake head having a semi-circular portion embracing the cross rod, apertured lugs projecting from the forked portion, apertured portions in the rake head, bolts extending through said apertured portion and the lugs, and means interposed between the apertured portion and the heads of the bolts for normally holding the rear side of the rake head in flat contact with the forward sides of the forked ends.

2. The combination with a rake including a handle and a head consisting of a tine supporting element and a plurality of tines, of a connection therebetween to permit of relative angular movement between the handle and head upon the exertion of a downward pressure and a forward movement of the rake over the ground whereby to clear the tines of obstructions, said connection comprising a forked sleeve carried by one extremity of the handle, a cross rod connecting the forked portion of the sleeve, a plate secured to the tine supporting bar having a semi-circular portion embracing the cross rod, apertured lugs projecting from the forked portion, apertured portions in the tine supporting bar, bolts extending through said apertured lugs and apertured portions, and springs interposed between the apertured portions and the heads of the bolts, as and for the purpose specified.

BERT E. LEAS.